(12) United States Patent
Zhang et al.

(10) Patent No.: US 12,536,454 B2
(45) Date of Patent: Jan. 27, 2026

(54) TODDLER-INSPIRED BAYESIAN LEARNING METHOD AND COMPUTING APPARATUS FOR PERFORMING THE SAME

(71) Applicant: SEOUL NATIONAL UNIVERSITY R&DB FOUNDATION, Seoul (KR)

(72) Inventors: Byoung-Tak Zhang, Seoul (KR); Youngki Lee, Seoul (KR); Junseok Park, Seoul (KR); Kwanyoung Park, Bucheon-si (KR); Hyunseok Oh, Seoul (KR); You Won Jang, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 1128 days.

(21) Appl. No.: 17/467,971

(22) Filed: Sep. 7, 2021

(65) Prior Publication Data

US 2022/0164689 A1  May 26, 2022

(30) Foreign Application Priority Data

Nov. 26, 2020  (KR) .................. 10-2020-0161732
Jan. 29, 2021  (KR) .................. 10-2021-0013224

(51) Int. Cl.
*G06N 7/01* (2023.01)
*G06N 20/10* (2019.01)

(52) U.S. Cl.
CPC .............. *G06N 7/01* (2023.01); *G06N 20/10* (2019.01)

(58) Field of Classification Search
CPC ................................ G06N 7/01; G06N 20/10
See application file for complete search history.

(56) References Cited

U.S. PATENT DOCUMENTS

| 6,907,591 B1 | 6/2005 | Teig et al. |
| 10,817,779 B2 | 10/2020 | Bourgoin et al. |
| 2015/0242745 A1 | 8/2015 | Wang et al. |
| 2019/0035504 A1 | 1/2019 | Jang |

FOREIGN PATENT DOCUMENTS

| KR | 10-0757089 B1 | 9/2007 |
| KR | 10-2016-0123309 A | 10/2016 |
| KR | 10-1830314 B1 | 2/2018 |
| KR | 10-2019-0135129 A | 12/2019 |
| KR | 10-2020-0107347 A | 9/2020 |

OTHER PUBLICATIONS

Brown, Daniel, Coleman, R., Srinivasan, R., & Niekum, S. (n.d.). Safe imitation learning via Fast Bayesian reward . . . https://arxiv.org/pdf/2002.09089v1 (Year: 2020).*

(Continued)

*Primary Examiner* — Kamran Afshar
*Assistant Examiner* — Lokesha Patel
(74) *Attorney, Agent, or Firm* — Sughrue Mion, PLLC (57) ABSTRACT

A toddler-inspired Bayesian learning method according to an embodiment includes: collecting information related to at least one task while an agent is performing exploration; and performing Bayesian inference regarding the at least one task by using the collected information as Bayesian informative priors.

6 Claims, 7 Drawing Sheets

(56) References Cited

OTHER PUBLICATIONS

Ullman, T. D., & Tenenbaum, J. B. (2020). Bayesian models of conceptual development: Learning as building models of the world. Annual Review of Developmental Psychology, 2(1), 533-558. (Year: 2020).*

Yan, W., Shao, H., & Wang, X. (2004). Soft sensing modeling based on support vector machine and Bayesian model selection. Computers & chemical engineering, 28(8), 1489-1498. (Year: 2004).*

Sven Bambach et al., "Toddler-Inspired Visual Object Learning", 32nd Conference on Neural Information Processing Systems (NeurIPS 2018), 2018, 10 pages total.

Park et al., "Bayesian Toddler-Inspired Learning", Proceedings of the 2020 Korean Computer Science Conference, 2020, pp. 821-823 (4 pages total).

* cited by examiner

TODDLER-INSPIRED BAYESIAN LEARNING METHOD AND COMPUTING APPARATUS FOR PERFORMING THE SAME

CROSS-REFERENCE TO RELATED APPLICATION

This application claims the benefit of Korean Patent Application No. 10-2020-0161732 filed on Nov. 26, 2020, and Korean Patent Application No. 10-2021-0013224 filed on Jan. 29, 2021, which are hereby incorporated by reference herein in its entirety.

BACKGROUND

1. Technical Field

The embodiments disclosed herein relate generally to machine learning, and more particularly to a Bayesian learning method that makes use of the learning method of toddlers in order to overcome the limitations of the conventional supervised learning that requires a large amount of labeled learning data.

This study was conducted as a part of research for the Innovation Growth Engine Project sponsored by the Korean Ministry of Science and ICT and the Institute of Information & Communications Technology Planning & Evaluation (IITP-2017-0-01772-005).

This study was conducted as a part of research for the ICT Convergence Industry Fundamental Technology Development Project sponsored by the Korean Ministry of Science and ICT and the Institute of Information & Communications Technology Planning & Evaluation (IITP-2018-0-00622-004).

This study was conducted as a part of research for the Innovation Growth Engine Project sponsored by the Korean Ministry of Science and ICT and the Institute of Information & Communications Technology Planning & Evaluation (IITP-2019-0-01367-003).

This study was conducted as a part of research for the SW Computing Industry Source Technology Development Project sponsored by the Korean Ministry of Science and ICT and the Institute of Information & Communications Technology Planning & Evaluation (IITP-2015-0-00310-007).

2. Description of the Related Art

In the case of the conventional supervised learning algorithms, a large amount of labeled data is required for learning, and there is the limitation that it is difficult to apply the knowledge learned for a single task to other tasks.

Meanwhile, in the process of human learning, humans accumulate and expand knowledge through experiences obtained while actively interacting with their surroundings. In other words, humans can actively perform learning even when data for learning is not provided.

In particular, toddlers can accumulate data on objects by interacting with them in such a manner that they see, touch, and feel the objects, and can also accumulate knowledge required to determine the types of objects, the touches of objects, and the distances to objects based on the above-accumulated data.

Therefore, when a method by which toddlers learn is incorporated into a machine learning algorithm, learning can be actively performed without labeled data, and also there can be expected the effect of extending the knowledge learned for a specific task to other tasks.

Meanwhile, the above-described background technology corresponds to technical information that has been possessed by the present inventor in order to contrive the present invention or that has been acquired in the process of contriving the present invention, and can not necessarily be regarded as well-known technology that had been known to the public prior to the filing of the present invention.

SUMMARY

The embodiments disclosed herein are intended to provide a Bayesian learning method that can expand knowledge without labeled learning data by applying the learning method of toddlers who actively acquire knowledge through interaction to machine learning.

As a technical solution for accomplishing the above objects, according to an embodiment, there is provided a toddler-inspired Bayesian learning method including: collecting information related to at least one task while an agent is performing exploration; and performing Bayesian inference regarding the at least one task by using the collected information as Bayesian informative priors.

According to another embodiment, there is provided a computer program that is executed by a computing apparatus and stored in a medium in order to perform a toddler-inspired Bayesian learning method, wherein the toddler-inspired Bayesian learning method includes: collecting information related to at least one task while an agent is performing exploration; and performing Bayesian inference regarding the at least one task by using the collected information as Bayesian informative priors.

According to still another embodiment, there is provided a non-transitory computer-readable storage medium having stored thereon a program that, when executed by a computer, causes the computer to execute a toddler-inspired Bayesian learning method, wherein the toddler-inspired Bayesian learning method includes: collecting information related to at least one task while an agent is performing exploration; and performing Bayesian inference regarding the at least one task by using the collected information as Bayesian informative priors.

According to still another embodiment, there is provided a computing apparatus for performing toddler-inspired Bayesian learning, the computing apparatus including: an input/output interface configured to receive data, and to output a result obtained by performing operational processing on the data; storage configured to store a program and data required for the performance of toddler-inspired Bayesian learning; and a controller including at least one processor, and configured to perform the toddler-inspired Bayesian learning by executing the program; and wherein a toddler-inspired Bayesian learning model that is implemented in such a manner that the controller executes the program collects information related to at least one task in a process in which an agent is performing exploration, and performs Bayesian inference regarding the at least one task by using the collected information as Bayesian informative priors.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION

Various embodiments will be described in detail below with reference to the accompanying drawings. The following embodiments may be modified to various different forms and then practiced. In order to more clearly illustrate features of the embodiments, detailed descriptions of items that are well known to those having ordinary skill in the art to which the following embodiments pertain will be omitted. Furthermore, in the drawings, portions unrelated to descriptions of the embodiments will be omitted. Throughout the specification, like reference symbols will be assigned to like portions.

Throughout the specification, when one component is described as being "connected" to another component, this includes not only a case where the one component is "directly connected" to the other component but also a case where the one component is "connected to the other component with a third component arranged therebetween." Furthermore, when one portion is described as "including" one component, this does not mean that the portion does not exclude another component but means that the portion may further include another component, unless explicitly described to the contrary.

Prior to the detailed description of the embodiments, the terms frequently used herein will be first described.

The term "Bayesian learning" refers to a learning method in which the Bayesian probability theory is applied to machine learning. In particular, it refers to a method of using the posterior probability, calculated through Bayesian inference, when performing inference such as image classification. The present specification discloses embodiments in which the learning method of toddlers is applied to Bayesian learning. To express the characteristics of the method of the embodiments, the method of the embodiments is named "toddler-inspired Bayesian learning."

The embodiments of the present invention will be described in detail below with reference to the accompanying drawings. First, the configuration of a computing apparatus for performing toddler-inspired Bayesian learning according to an embodiment will be briefly described with reference to FIG. 1. Next, the process of performing toddler-inspired Bayesian learning according to an embodiment will be described in detail with reference to FIGS. 2 and 3.

Figure 1:
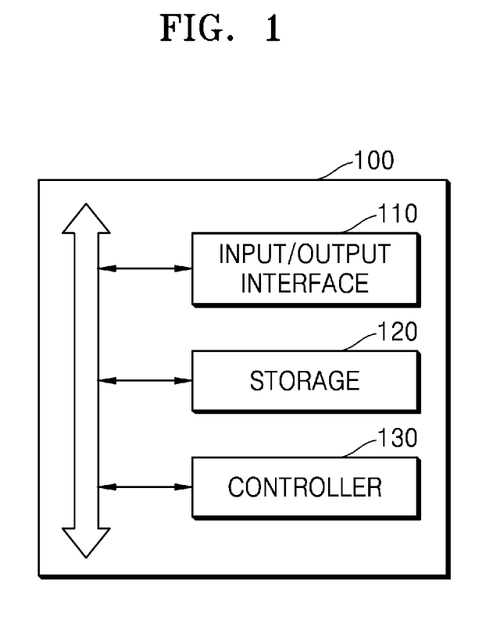
FIG. 1 is a diagram showing the configuration of a computing apparatus for performing toddler-inspired Bayesian learning according to an embodiment.

FIG. 1 is a diagram showing the configuration of the computing apparatus for performing toddler-inspired Bayesian learning according to the present embodiment. Referring to FIG. 1, the computing apparatus 100 according to the present embodiment may include an input/output interface 110, storage 120, and a controller 130.

The input/output interface 110 is configured to receive a user's commands or data related to toddler-inspired Bayesian learning and to output the results of the performance of toddler-inspired Bayesian learning. The input/output interface 110 may include various types of input devices (e.g., a keyboard, a touch screen, etc.) for receiving input from the user and also a connection port or communication module for transmitting and receiving data used for toddler-inspired Bayesian learning and data on the results of learning.

The storage 120 is configured to store files and programs, and may be formed of various types of memory. In particular, the storage 120 may store data and programs that enable the controller 130, to be described later, to perform operations for toddler-inspired Bayesian learning according to a process proposed below.

The controller 130 is configured to include at least one processor such as a central processing unit (CPU) and to perform toddler-inspired Bayesian learning according to the process proposed below by executing a program stored in the storage 120. In other words, the toddler-inspired Bayesian learning model 300 shown in FIG. 3 is implemented in such a manner that the controller 130 executes a program stored in the storage 120, and then the controller 130 performs learning through the toddler-inspired Bayesian learning model 300.

A process in which the controller 130 performs toddler-inspired Bayesian learning according to an embodiment by executing a program stored in the storage 120 will be described in detail below with reference to FIGS. 1 to 3.

Figure 2:
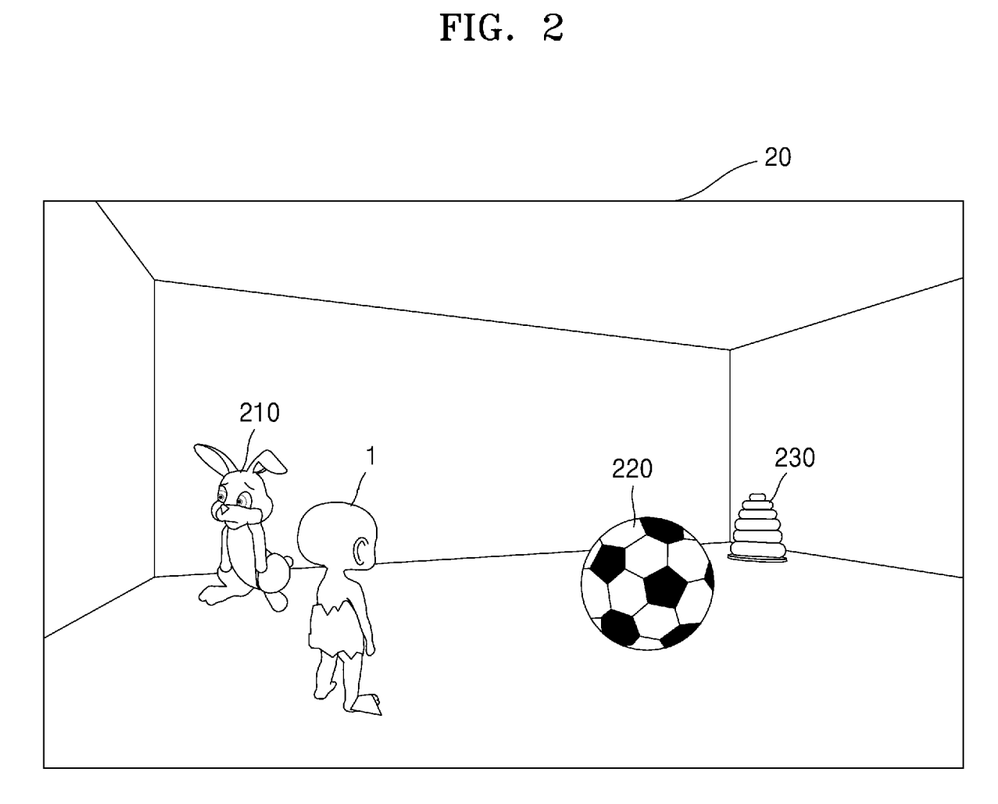
FIG. 2 is a diagram illustrating a virtual environment in which an agent collects information through exploration in the performance of toddler-inspired Bayesian learning according to an embodiment.
Figure 3:
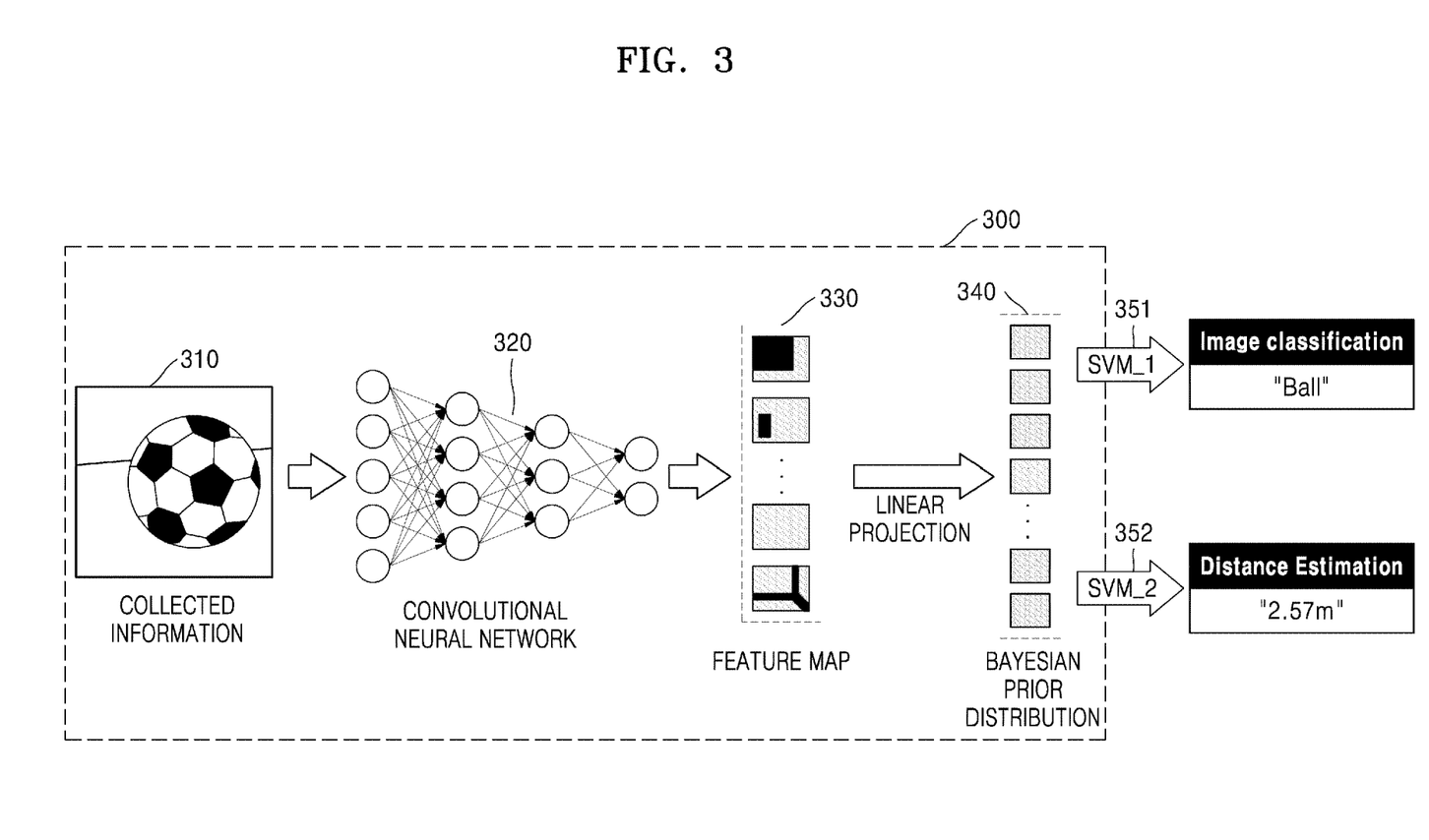
FIG. 3 is a diagram showing a neural network model for performing toddler-inspired Bayesian learning according to an embodiment.

FIG. 2 is a diagram illustrating a virtual environment in which an agent collects information through exploration in the performance of toddler-inspired Bayesian learning according to an embodiment, and FIG. 3 is a diagram illustrating a neural network model for performing toddler-inspired Bayesian learning according to an embodiment.

In other words, the virtual environment 20 shown in FIG. 2, an agent 1, and objects 210, 220, and 230 present in the virtual environment 20 are components that are used in a process in which the toddler-inspired Bayesian learning model 300 of FIG. 3 collects information 310.

As described above, since the toddler-inspired Bayesian learning model 300 is implemented in such a manner that the controller 130 executes the program stored in the storage 120, operations or steps described as being performed by the toddler-inspired Bayesian learning model 300 may be viewed as being actually performed by the controller 130 in the following embodiments. In addition, detailed components included in the toddler-inspired Bayesian learning model 300 may be viewed as software units that are in charge of specific functions or roles, respectively, in the overall program for performing toddler-inspired Bayesian learning.

First, a process in which the toddler-inspired Bayesian learning model 300 collects the information 310 to be used as Bayesian informative priors will be described with reference to FIG. 2. The virtual environment 20 shown in FIG. 2, the agent 1, and the objects 210, 220 and, 230 present in the virtual environment 20 are implemented by the toddler-inspired Bayesian learning model 300.

The agent 1 may perform exploration while freely moving in the virtual environment 20, and may interact with the objects 210, 220, and 230. For example, the agent 1 may receive an 84*84 RGB image as input, and may perform a "walking" operation represented by a two-dimensional velocity vector. In addition, when the agent 1 comes into contact with any one of the objects 210, 220, and 230, the agent 1 may perform interaction by performing an operation such as holding, pressing, or kicking the object. The agent 1 receives a reward corresponding to the type of interaction it has with the objects 210, 220, and 230. According to an embodiment, the agent 1 may maximize the reward it receives by exploring the virtual environment 20 according to a reinforcement learning algorithm.

As described above, the agent 1 may collect information related to tasks (e.g., image classification, and distance estimation) to be inferred by the toddler-inspired Bayesian learning model 300 by randomly performing a plurality of types of operations in the virtual environment 20 according to the reinforcement learning algorithm and receiving a reward according to the interaction with the objects 210, 220, and 230 present in the virtual environment 20.

Meanwhile, FIG. 2 shows only an embodiment in which the agent 1 collects information while performing exploration in the virtual environment 20. Alternatively, the toddler-inspired Bayesian learning model 300 may perform Bayesian inference by using information that an agent (e.g., a robot, or the like) capable of operating in a real environment collects through interaction with real objects while performing exploration.

The toddler-inspired Bayesian learning model 300 shown in FIG. 3 may perform Bayesian inference regarding at least one task by using the information 310, collected by the agent 1 in the process of performing exploration, as Bayesian informative priors. The process of performing Bayesian inference by using the information 310, collected by the toddler-inspired Bayesian learning model 300, as Bayesian informative priors will be described in detail as follows.

Referring to FIG. 3, the toddler-inspired Bayesian learning model 300 applies visual information $x \in \mathbb{R}^{6 \times 84 \times 84}$, which is the information 310 that the agent 1 collects through interaction with the objects 210, 220, and 230 while exploring the virtual environment 20, as input to a convolutional neural network 320. The convolutional neural network 320 used in this case may be a neural network that has already been trained for at least one task (e.g., image classification, distance estimation, or the like) to be performed by the toddler-inspired Bayesian learning model 300. As a result, the convolutional neural network 320 outputs a feature map 330.

Thereafter, the toddler-inspired Bayesian learning model 300 calculates a Bayesian prior distribution $\text{Prior} \in \mathbb{R}^{d_p}$ 340, to be used for Bayesian inference by support vector machines (SVMs) 351 and 352, by using the feature map and a weight matrix W learned during the exploration of the agent 1. In this case, $d_p$ represents the dimension of the Bayesian prior distribution 340.

A process in which the toddler-inspired Bayesian learning model 300 calculates the Bayesian prior distribution 340 using the feature map and the weight matrix W will be described in detail as follows.

First, the toddler-inspired Bayesian learning model 300 converts the feature map 330 into a feature vector $z \in \mathbb{R}^{n \cdot h \cdot w}$ using a flatten function Flatten(•). In this case, the flatten function is a function that converts a given matrix into a vector.

As described above, the process of converting the collected information 310 x into a feature vector z may be represented by Equation 1 below:

$$z = \text{Flatten}(Enc(x)) \quad (1)$$

The convolutional neural network 320 is represented by Enc(•).

Thereafter, the toddler-inspired Bayesian learning model 300 may calculate the Bayesian prior distribution 340 by linearly projecting the feature vector z through the weight matrix W. This is represented by Equation 2 below:

$$\text{Prior}(x) = RBF(W^T z) \quad (2)$$

In this case, RBF (radial basis function) is a type of kernel used in the SVMs.

The Bayesian prior distribution 340 calculated through this process may be applied as input to the first support vector machine (SVM) 351 and the second SVM 352. The first and second SVMs 351 and 352 may calculate posterior probabilities related to tasks assigned thereto, respectively, according to the input Bayesian prior distribution 340, and may output inference results for the respective tasks based on the calculated posterior probabilities. In the embodiment shown in FIG. 3, through this process, the first SVM 351 outputs the result of image classification ("a ball") for the collected information 310, and the second SVM 352 outputs the result of distance estimation ("2.57 m") for the collected information 310.

As described above, the toddler-inspired Bayesian learning model 300 may perform inference regarding a plurality of tasks (image classification, and distance estimation) by directly using the information 310, which the agent 1 collects in the process of interacting with the objects 210, 220, and 230 while freely exploring the virtual environment 20, without labeling. Accordingly, there may be expected the effects of accumulating knowledge without an artificial labeling process and expanding the accumulated knowledge to various tasks.

A method of performing toddler-inspired Bayesian learning using the computing apparatus 100 as described above will be described. FIGS. 4 to 7 are flowcharts illustrating toddler-inspired Bayesian learning methods according to embodiments.

The toddler-inspired Bayesian learning method according to each of the embodiments shown in FIGS. 4 to 7 includes steps that are performed in a time-series manner in the computing apparatus 100 shown in FIG. 1. Accordingly, the descriptions that are omitted below but are given above in conjunction with the computing apparatus 100 shown in FIG. 1 may also be applied to the toddler-inspired Bayesian learning method according to each of the embodiments shown in FIGS. 4 to 7. In particular, a subject that performs the steps included in the flowcharts shown in FIGS. 4 to 7 is the toddler-inspired Bayesian learning model 300 that is implemented in such a manner that the controller 130 executes the program stored in the storage 120.

Figure 4:
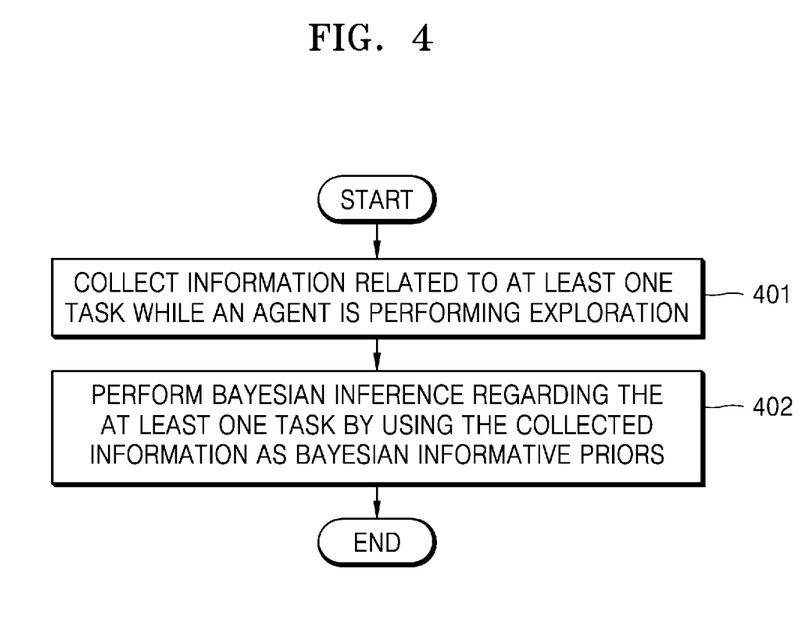
FIGS. 4 to 7 are flowcharts illustrating toddler-inspired Bayesian learning methods according to embodiments.

Referring to FIG. 4, at step 401, the agent collects information related to at least one task in the process of performing exploration. Detailed steps included in step 401 are shown in FIG. 5.

Figure 5:
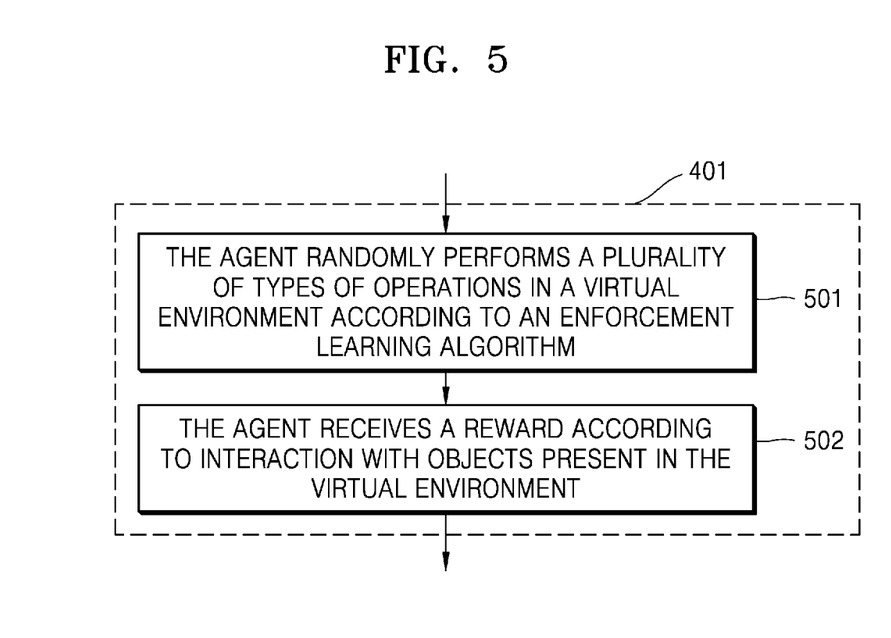

Referring to FIG. 5, at step 501, the agent may randomly perform a plurality of types of operations in a virtual environment according to a reinforcement learning algorithm. At step 502, the agent may obtain a reward according to the interaction with objects present in the virtual environment.

Referring back to FIG. 4, at step 402, the toddler-inspired Bayesian learning model 300 may perform Bayesian inference regarding the at least one task by using the collected information as Bayesian informative priors. Detailed steps included in step 402 are shown in FIG. 6.

Figure 6:
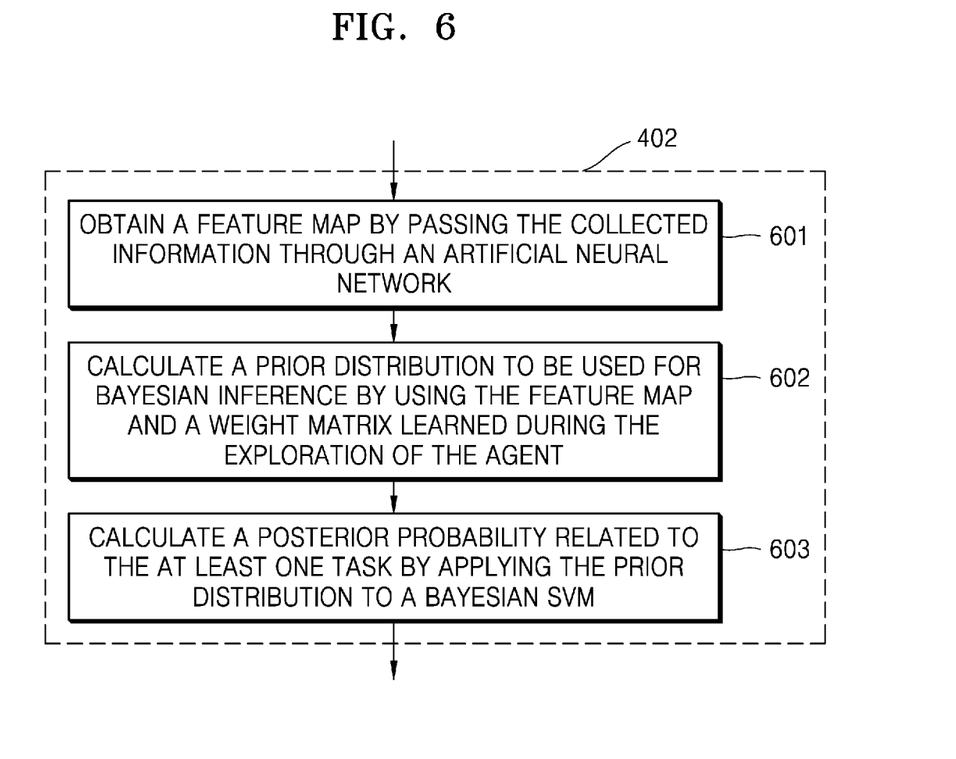

Referring to FIG. 6, at step 601, the toddler-inspired Bayesian learning model 300 obtains a feature map by passing the collected information through an artificial neural network (a convolutional neural network). At step 602, the toddler-inspired Bayesian learning model 300 may calculate a prior distribution to be used for Bayesian inference by using the feature map and a weight matrix learned during exploration of the agent. At step 603, the toddler-inspired Bayesian learning model 300 may calculate a posterior probability related to the at least one task by applying the prior distribution to a Bayesian SVM. The toddler-inspired Bayesian learning model 300 may output the results of inference for the at least one task based on the calculated posterior probability.

Figure 7:
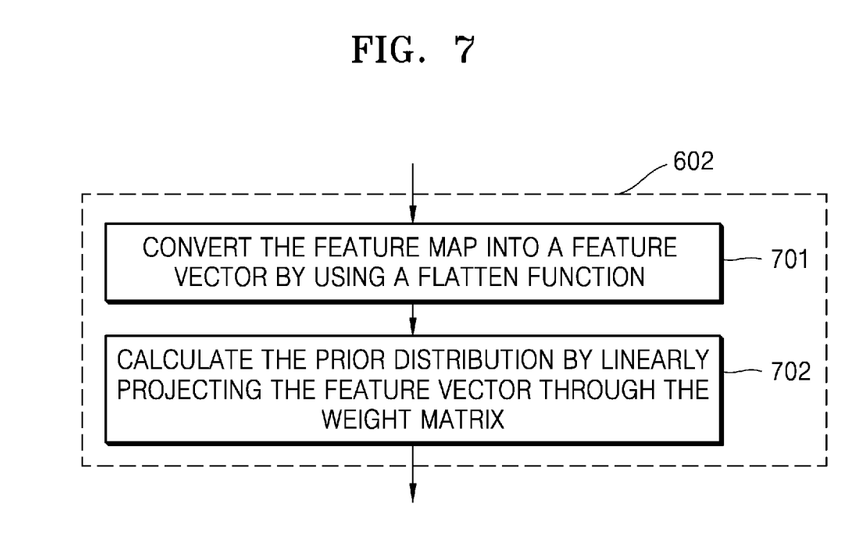

Meanwhile, detailed steps included in step 602 are shown in FIG. 7. Referring to FIG. 7, at step 701, the toddler-inspired Bayesian learning model 300 converts the feature map into a feature vector using a flatten function. At step 702, the toddler-inspired Bayesian learning model 300 calculates a prior distribution by linearly projecting the feature vector through a weight matrix.

According to the above-described embodiments, Bayesian inference is performed by using the information, collected in a process in which the agent performs exploration, as Bayesian informative priors, so that even when there is no labeled data, there may be expected the effect of expanding knowledge by incorporating the information collected through the exploration thereinto.

The effects that can be obtained by the embodiments disclosed herein are not limited to the above-described effects, and other effects that have not been described above will be clearly understood by those having ordinary skill in the art, to which the present invention pertains, from the foregoing description.

The term "unit" used in the above-described embodiments means software or a hardware component such as a field-programmable gate array (FPGA) or application-specific integrated circuit (ASIC), and a "unit" performs a specific role. However, a "unit" is not limited to software or hardware. A "unit" may be configured to be present in an addressable storage medium, and also may be configured to run one or more processors. Accordingly, as an example, a "unit" includes components, such as software components, object-oriented software components, class components and task components, processes, functions, attributes, procedures, subroutines, segments in program code, drivers, firmware, microcode, circuits, data, a database, data structures, tables, arrays, and variables.

Components and a function provided in "unit(s)" may be coupled to a smaller number of components and "unit(s)" or divided into a larger number of components and "unit(s)."

In addition, components and "unit(s)" may be implemented to run one or more CPUs in a device or secure multimedia card.

The toddler-inspired Bayesian learning method according to each of the embodiments described in conjunction with FIGS. 4 to 7 may be implemented in the form of a computer-readable medium that stores instructions and data that can be executed by a computer. In this case, the instructions and the data may be stored in the form of program code, and may generate a predetermined program module and perform a predetermined operation when executed by a processor. Furthermore, the computer-readable medium may be any type of available medium that can be accessed by a computer, and may include volatile, non-volatile, separable and non-separable media. Furthermore, the computer-readable medium may be a computer storage medium. The computer storage medium may include all volatile, non-volatile, separable and non-separable media that store information, such as computer-readable instructions, a data structure, a program module, or other data, and that are implemented using any method or technology. For example, the computer storage medium may be a magnetic storage medium such as an HDD, an SSD, or the like, an optical storage medium such as a CD, a DVD, a Blu-ray disk or the like, or memory included in a server that can be accessed over a network.

Furthermore, the toddler-inspired Bayesian learning method according to each of the embodiments described in conjunction with FIGS. 4 to 7 may be implemented as a computer program (or a computer program product) including computer-executable instructions. The computer program includes programmable machine instructions that are processed by a processor, and may be implemented as a high-level programming language, an object-oriented programming language, an assembly language, a machine language, or the like. Furthermore, the computer program may be stored in a tangible computer-readable storage medium (for example, memory, a hard disk, a magnetic/optical medium, a solid-state drive (SSD), or the like).

Accordingly, the toddler-inspired Bayesian learning method according to each of the embodiments described in conjunction with FIGS. 4 to 7 may be implemented in such a manner that the above-described computer program is executed by a computing apparatus. The computing apparatus may include at least some of a processor, memory, a storage device, a high-speed interface connected to memory and a high-speed expansion port, and a low-speed interface connected to a low-speed bus and a storage device. These individual components are connected using various buses, and may be mounted on a common motherboard or using another appropriate method.

In this case, the processor may process instructions within a computing apparatus. An example of the instructions is instructions that are stored in memory or a storage device in order to display graphic information for providing a Graphic User Interface (GUI) onto an external input/output device, such as a display connected to a high-speed interface. As another embodiment, a plurality of processors and/or a plurality of buses may be appropriately used along with a plurality of pieces of memory. Furthermore, the processor may be implemented as a chipset composed of chips including a plurality of independent analog and/or digital processors.

Furthermore, the memory stores information within the computing device. As an example, the memory may include a volatile memory unit or a set of the volatile memory units. As another example, the memory may include a non-volatile memory unit or a set of the non-volatile memory units. Furthermore, the memory may be another type of computer-readable medium, such as a magnetic or optical disk.

In addition, the storage device may provide a large storage space to the computing device. The storage device may be a computer-readable medium, or may be a configuration including such a computer-readable medium. For example, the storage device may also include devices within a storage area network (SAN) or other elements, and may be a floppy disk device, a hard disk device, an optical disk device, a tape device, flash memory, or a similar semiconductor memory device or array.

The above-described embodiments are intended for illustrative purposes. It will be understood that those having ordinary knowledge in the art to which the present invention pertains can easily make modifications and variations without changing the technical spirit and essential features of the present invention. Therefore, the above-described embodiments are illustrative and are not limitative in all aspects. For example, each component described as being in a single form may be practiced in a distributed form. In the same manner, components described as being in a distributed form may be practiced in an integrated form.

The scope of protection pursued through the present specification should be defined by the attached claims, rather than the detailed description. All modifications and variations which can be derived from the meanings, scopes and equivalents of the claims should be construed as falling within the scope of the present invention.

What is claimed is:

1. A toddler-inspired Bayesian learning method performed by a computing device including at least one processor, a memory storing a toddler-inspired Bayesian learning model and result data of the toddler-inspired Bayesian learning model, and a communication module transmitting the result data of the toddler-inspired Bayesian learning model, wherein the computing device implements a virtual environment and virtual objects in the virtual environment, wherein the processor executes instructions to implement the toddler-inspired Bayesian learning model, the method for performing image classification and distance estimation for one of the virtual objects comprising:
collecting visual information related to the image classification and the distance estimation for the one virtual object while an agent of the virtual environment is performing exploration in the virtual environment through interaction with the virtual objects in the virtual environment; and
performing Bayesian inference regarding the image classification and the distance estimation for the one virtual object by using the collected visual information as a prior distribution to be used for the Bayesian inference, wherein performing the Bayesian inference comprises:
obtaining a feature map by passing the collected visual information through an artificial neural network;
calculating the prior distribution to be used for the Bayesian inference by using the feature map and a weight matrix learned during the exploration of the agent; and
calculating posterior probabilities respectively related to the image classification and the distance estimation for the one virtual object by applying the prior distribution as a same prior distribution to a plurality of Bayesian Support Vector Machines (SVMs) respectively,
wherein obtaining the feature map comprises obtaining the feature map by inputting the collected visual information into a convolutional neural network in which learning related to the image classification and the distance estimation has been performed,
wherein calculating the prior distribution comprises:
converting the feature map into a feature vector by using a flatten function; and
calculating the prior distribution by linearly projecting the feature vector through the weight matrix,
wherein calculating the prior distribution by linearly projecting the feature vector comprises calculating the same prior distribution by applying a result, obtained by multiplying the feature vector and a transpose of the weight matrix, to a radial basis function (RBF) kernel,
wherein calculating the posterior probabilities respectively related to the image classification and the distance estimation for the one virtual object comprises:
inputting the same prior distribution to a first Bayesian Support Vector Machine for classifying images of the one virtual object, calculating a first posterior probability for the image classification through the first Bayesian Support Vector Machine, and outputting an inference result for the image classification of the one virtual object based on the first posterior probability; and
inputting the same prior distribution to a second Bayesian Support Vector Machine for estimating distances of the one virtual object, calculating a second posterior probability for the distance estimation through the second Bayesian Support Vector Machine, and outputting an inference result for the distance estimation of the one virtual object based on the second posterior probability.

2. The toddler-inspired Bayesian learning method of claim 1, wherein collecting the visual information comprises collecting the visual information in such a manner that the agent randomly performs a plurality of types of operations in the virtual environment according to a reinforcement learning algorithm and obtains a reward according to interaction with objects present in the virtual environment.

3. A non-transitory computer-readable storage medium having stored thereon a program that, when executed by a computer, causes the computer to execute the toddler-inspired Bayesian learning method set forth in claim 1.

4. A computer program that is executed by a computing apparatus and stored in a medium in order to perform the toddler-inspired Bayesian learning method set forth in claim 1.

5. A computing apparatus for implementing a virtual environment and virtual objects in the virtual environment to perform image classification and distance estimation for one of the virtual objects by performing toddler-inspired Bayesian learning, the computing apparatus comprising:
a controller including at least one processor, and configured to perform the toddler-inspired Bayesian learning by executing a program;
a memory storing a toddler-inspired Bayesian learning model and result data of the toddler-inspired Bayesian learning model; and
a communication module transmitting the result data of the toddler-inspired Bayesian learning model,
wherein the processor, by executing instructions to implement the toddler-inspired Bayesian learning model, is configured to
collect visual information related to the image classification and the distance estimation for the one virtual object in a process in which an agent of the virtual environment is performing exploration in the virtual environment through interaction with the virtual objects in the virtual environment, and
perform Bayesian inference regarding the image classification and the distance estimation for the one virtual object by using the collected visual information as a prior distribution to be used for the Bayesian inference,
wherein when performing the Bayesian inference, the processor is configured to
obtain a feature map by passing the collected visual information through an artificial neural network;
calculate the prior distribution to be used for the Bayesian inference by using the feature map and a weight matrix learned during the exploration of the agent; and
calculate posterior probabilities respectively related to the image classification and the distance estimation for the one virtual object by applying the prior distribution as a same prior distribution to a plurality of Bayesian Support Vector Machines (SVMs) respectively, wherein when obtaining the feature map, the toddler-inspired Bayesian learning model obtains the feature map by inputting the collected visual information into a convolutional neural network in which learning related to the image classification and the distance estimation has been performed, wherein when calculating the prior distribution, the toddler-inspired Bayesian learning model converts the feature map into a feature vector by using a flatten function, and calculates the prior distribution by linearly projecting the feature vector through the weight matrix, wherein when calculating the prior distribution by linearly projecting the feature vector, the toddler-inspired Bayesian learning model calculates the same prior distribution by applying a result, obtained by multiplying the feature vector and a transpose of the weight matrix, to a radial basis function (RBF) kernel, wherein when calculating the posterior probabilities respectively related to the image classification and the distance estimation for the one virtual object, the processor is configured to input the same prior distribution to a first Bayesian Support Vector Machine for classifying images of the one virtual object, calculate a first posterior probability for the image classification through the first Bayesian Support Vector Machine, and output an inference result for the image classification of the one virtual object based on the first posterior probability; and input the same prior distribution to a second Bayesian Support Vector Machine for estimating distances of the interacted virtual objects, calculate a second posterior probability for the distance estimation through the second Bayesian Support Vector Machine, and output an inference result for the distance estimation of the one virtual object based on the second posterior probability.

6. The computing apparatus of claim 5, wherein when collecting the visual information, the toddler-inspired Bayesian learning model collects the visual information in such a manner that the agent randomly performs a plurality of types of operations in the virtual environment according to a reinforcement learning algorithm and obtains a reward according to interaction with objects present in the virtual environment.

* * * * *